United States Patent
Yoshida et al.

[11] Patent Number: 6,020,060
[45] Date of Patent: Feb. 1, 2000

[54] MAGNETIC RECORDING MEDIUM, PROCESS FOR PRODUCING THE SAME AND MAGNETIC DISK DEVICE

[75] Inventors: Yuki Yoshida; Chiaki Okuyama; Kenji Sato; Iwao Okamoto, all of Kawasaki, Japan

[73] Assignee: Fujitsu Limited, Kawasaki, Japan

[21] Appl. No.: 09/044,639

[22] Filed: Mar. 19, 1998

[30] Foreign Application Priority Data

Sep. 25, 1997 [JP] Japan ................................... 9-260333

[51] Int. Cl.$^7$ ........................................................ G11B 5/66
[52] U.S. Cl. ........................ 428/332; 428/336; 428/692; 428/694 R; 428/694 T; 428/694 TS; 428/694 TM; 428/65.3; 428/65.7; 427/128; 427/129; 427/130; 360/113; 360/135
[58] Field of Search .............................. 428/692, 694 R, 428/694 T, 694 TS, 694 TM, 65.3, 65.7, 336, 332, 900; 427/128–130; 360/113, 135

[56] References Cited

U.S. PATENT DOCUMENTS

| | | | |
|---|---|---|---|
| 5,004,652 | 4/1991 | Lal et al. | 428/611 |
| 5,302,434 | 4/1994 | Doerner | 428/65.6 |
| 5,800,931 | 9/1998 | Lee | 248/611 |
| 5,900,324 | 5/1999 | Moroishi | 428/611 |
| 5,922,456 | 7/1999 | Tanahashi | 428/332 |

FOREIGN PATENT DOCUMENTS

| | | |
|---|---|---|
| 58-77026 | 5/1983 | Japan . |
| 59-75609 | 4/1984 | Japan . |
| 60-64413 | 4/1985 | Japan . |
| 60-89813 | 5/1985 | Japan . |
| 60-89814 | 5/1985 | Japan . |
| 60-143424 | 7/1985 | Japan . |
| 62-177721 | 8/1987 | Japan . |
| 1256017 | 10/1989 | Japan . |
| 4228105 | 4/1991 | Japan . |
| 4184710 | 7/1992 | Japan . |
| 4228105 | 8/1992 | Japan . |
| 676279 | 8/1992 | Japan . |
| 6295401 | 1/1993 | Japan . |
| 676279 | 3/1994 | Japan . |
| 6295401 | 10/1994 | Japan . |
| 7307022 | 11/1995 | Japan . |

*Primary Examiner*—Leszek Kiliman
*Attorney, Agent, or Firm*—Greer, Burns, and Crain, Ltd

[57] ABSTRACT

A magnetic recording medium characterized by comprising: a nonmagnetic substrate; and, provided on the nonmagnetic substrate in the following order, a first underlayer of a nonmagnetic material composed mainly of chromium, a second underlayer of an antiferromagnetic material, with a body-centered cubic structure, having a Néel temperature of at least 60° C., the second underlayer being such that, when the crystal lattice of the antiferromagnetic material is compared with the crystal lattice in the body-centered cubic structure of the first underlayer, the length of a side of the lattice in the (100) face of the former is approximately equal to the length of a diagonal of the lattice in the (100) face of the latter, permitting the second underlayer to be epitaxially grown onto the first underlayer, and a recording layer of a magnetic material composed mainly of cobalt.

10 Claims, 4 Drawing Sheets

MAGNETIC RECORDING MEDIUM, PROCESS FOR PRODUCING THE SAME AND MAGNETIC DISK DEVICE

BACKGROUND OF THE INVENTION

1. Field of the Invention

The present invention relates to a magnetic recording medium and more particularly to a magnetic recording medium, particularly based on an in-plane magnetization recording system, which, through a reduction in thickness of the magnetic recording layer, can realize higher recording density and, despite the reduction in thickness of the magnetic recording layer, is thermally stable and can exhibit a satisfactorily high coercive force. Further, the present invention relates to a process for producing the magnetic recording medium, and a disk, for recording and reproducing information, using the magnetic recording medium.

2. Description of the Related Art

The development of information processing techniques has led to an increasing demand for an increase in recording density of magnetic disk devices used for external storage in computers. Specifically, in the reproducing head of the magnetic disk devices, the use of a magnetoresistive head utilizing a magnetoresistor, wherein the electric resistance changes in response to the magnetic field intensity, that is, an MR head, instead of the conventional wound-type inductive thin film magnetic head, has been proposed in the art. The MR head has applied magnetoresistance, that is, the change in electric resistance produced in a magnetic material on application of an external magnetic field, to the reproduction of a signal on a recording medium and has features including that the reproduction output margin is several times larger than that in the case of the conventional inductive thin film magnetic head, the inductance is small and a large S/N ratio can be expected. Further, the use of an AMR (anisotropic magnetoresistive) head utilizing anisotropic magnetoresistance, a GMR (giant magnetoresistive) head utilizing giant magnetoresistance, and a spin valve GMR head of practical type, besides the MR head, have also been proposed.

Further, in order to meet the demand for high-density recording, a sufficient improvement in properties to cope with the above MR head, AMR head, or GMR head (including spin valve head) has been demanded also in the magnetic recording medium used in the magnetic disk device. In particular, low tBr (a product of the thickness t and the residual magnetization density Br of a magnetic recording layer), low noise level, and high coercive force Hc are required of the magnetic recording medium. In order to meet such requirements, the prior art, for example, Japanese Unexamined Patent Publication (Kokai) No. 1-256017, discloses a magnetic recording medium comprising a nonmagnetic substrate, a chromium layer (thickness=100 nm) as an underlayer provided on the nonmagnetic substrate, and a magnetic layer (thickness=60 nm) provided on the chromium layer, the magnetic layer being formed of a CoCrTaPt-base four-component alloy and having a combination of a low noise level derived from CoCrTa-base alloy with high coercive force derived from CoCrPt-base alloy. U.S. Pat. No. 5,004,652 and its Japanese counterpart, Japanese Unexamined Patent Publication (Kokai) No. 4-228105 discloses a magnetic recording medium comprising a nonmagnetic substrate and a chromium layer (thickness=about 30–300 nm) and a magnetic layer of a CoCrPtTa four-component alloy (thickness=about 20–100 nm) formed in that order by sputtering on the nonmagnetic substrate. Further, Japanese Unexamined Patent Publication (Kokai) No. 5-72016 discloses a process for producing a magnetic recording medium, wherein a magnetic metallic thin layer is sputtered on a substrate.

Further, Japanese Unexamined Patent Publication (Kokai) No. 6-76279 discloses a thin-layer metal alloy magnetic recording disk comprising: a substrate, containing an aluminum alloy, having thereon a NiP surface covering; an NiO layer provided on the NiP covering; an underlayer provided on the NiO layer; and a magnetic layer, provided so as to cover the underlayer, comprising an alloy composed mainly of cobalt. In this magnetic recording disk, the NiO layer has been formed by oxidation of the NiP covering, offering advantages including that the smoothness of the NiP covering is retained as it is, offering a smoother disk surface, scratches finally left in the step of polishing the surface of the NiP covering can be eliminated, and the magnetic layer, which is later deposited by sputtering on the NiO layer, can have high saturated coercive force, enabling the disk to be used in a disk file system in which a recording head is contacted with the disk.

In the above unexamined patent publications and other patent publications, the recording density and the coercive force of the magnetic recording medium are simultaneously enhanced particularly through an improvement in composition of the magnetic recording layer. However, an improvement in thermal stability, which, in the present invention, is expected to be attained simultaneously with the enhanced recording density and the coercive force, remains unattained. Specifically, a reduction in the thickness of the magnetic recording layer in the magnetic recording medium results in improved resolution, realizing recording at higher density. When the layer thickness is reduced beyond a limit, the improved coercive force, on the contrary, is lowered and, in addition, the thermal stability becomes poor, making it impossible to use the material as a magnetic recording medium. In particular, the problem of thermal instability in the magnetic recording medium occurs at room temperature, and, hence, complete solution to this problem has been desired in the art.

SUMMARY OF THE INVENTION

A first object of the present invention is to solve the above problem of the prior art and to provide a magnetic recording medium which, despite a reduction in thickness of the magnetic recording layer, can maintain high coercive force, which leads to high reproduction output, and, in addition, is thermally stable and suitable for high density recording.

A second object of the present invention is to provide a process for producing such an excellent magnetic recording medium.

A third object of the present invention is to provide a magnetic disk device using the magnetic recording medium according to the present invention.

Other objects of the present invention can be easily understood from the following detailed description.

According to one aspect of the present invention, there is provided a magnetic recording medium characterized by comprising: a nonmagnetic substrate; and, provided on the nonmagnetic substrate in the following order, a first underlayer of a nonmagnetic material composed mainly of chromium, a second underlayer of an antiferromagnetic material, with a body-centered cubic structure, having a Néel temperature of at least 60° C., the second underlayer being such that, when the crystal lattice of the antiferromagnetic material is compared with the crystal lattice in the body-centered cubic structure of the first underlayer, the length of a side of the lattice in the (100) face of the former being approximately equal to the length of a diagonal of the lattice in the (100) face of the latter, permitting the second underlayer to be epitaxially grown onto the first underlayer, and a recording layer of a magnetic material composed mainly of cobalt.

According to another aspect of the present invention, there is provided a process for producing a magnetic recording medium, characterized by comprising sputtering a first underlayer of a nonmagnetic material composed mainly of chromium, a second underlayer of an antiferromagnetic material, with a body-centered cubic structure, having a Néel temperature of at least 60° C., the second underlayer being such that, when the crystal lattice of the antiferromagnetic material is compared with the crystal lattice in the body-centered cubic structure of the first underlayer, the length of a side of the lattice in the (100) face of the former being approximately equal to the length of a diagonal of the lattice in the (100) face of the latter, permitting the second underlayer to be epitaxially grown onto the first underlayer, and a recording layer of a magnetic material composed mainly of cobalt, in that order on a nonmagnetic substrate.

According to a further aspect of the present invention, there is provided a magnetic disk device comprising: a recording head section for recording information in a magnetic recording medium; and a reproducing head section for reproducing information, characterized in that the magnetic recording medium is one according to the present invention and the reproducing head section is provided with a magnetoresistive head.

DESCRIPTION OF THE PREFERRED EMBODIMENTS

Figure 1:
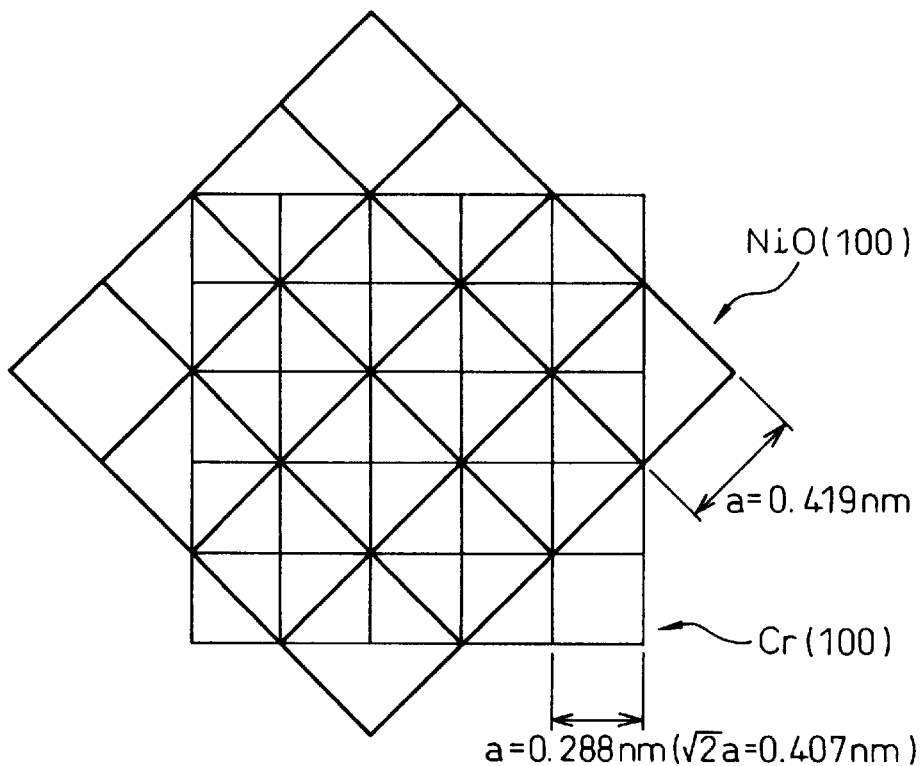
FIG. 1 is a model diagram showing crystal lattices of Cr and NiO respectively used as the first and second underlayers in the magnetic recording medium according to the present invention.

A detailed description of the magnetic recording medium according to the present invention will be given hereinafter, but first the excellent properties offered by the medium according to the present invention, that rely upon the layer construction of the first and second underlayers characteristic of the present invention, will be described with reference to FIG. 1 showing a model diagram of crystal lattice.

The magnetic recording medium referred to herein is a magnetic recording medium comprising: an NiP-plated aluminum disk; a nonmagnetic underlayer (a first underlayer), composed mainly of chromium, provided on the NiP-plated aluminum disk; and an underlayer (a second underlayer) of an antiferromagnetic material having a Néel temperature of 252° C., NiO, interposed between the first underlayer and a magnetic recording layer of an alloy composed mainly of cobalt. FIG. 1 is a model diagram of crystal lattices of chromium and NiO used respectively as the first and second underlayers. The length of a side of the lattice (spacing a =0.419 nm) in the (100) face of NiO is approximately equal to the length of a diagonal (0.407 nm) of the lattice (spacing a =0.288 nm) in the (100) face of chromium. Therefore, when the layer construction adopted is such that the first underlayer is formed of chromium and the second underlayer is formed of NiO, NiO can be epitaxially grown on Cr (100). For this reason, provision of NiO as the second underlayer, like the underlayer composed mainly of chromium in the prior art method, permits the crystallographic orientation to be controlled so that the c axis of the magnetic recording layer of a cobalt alloy formed thereon is positioned within plane. Further, exchange interaction between the underlayer of NiO as an antiferromagnetic material and the magnetic recording layer as a ferromagnetic stabilizes the magnetization of the magnetic layer, permitting magnetic relaxation derived from thermal energy (the large magnetic relaxation resulting in a loss of long-term stability) to be controlled.

Japanese Unexamined Patent Publication (Kokai) No. 6-76279, previously referred to as the prior art, also discloses a combination of an NiO layer with a chromium layer. However, the above function and effect of the present invention cannot be expected from the layer construction described in this publication. In particular, in the magnetic recording disk described in this publication, in order to attain the effect of retaining the smoothness of the NiP layer as it is to provide a smooth disk surface and the effect of eliminating scratches left in the step of polishing the surface of NiP and other effects, a premise is that an NiO layer should be present just above an NiP layer on the substrate including an aluminum alloy. Further, in order to cope with this, an NiO layer should be formed by surface oxidation of NiP. Furthermore, in the disk described in this publication, since an antiferromagnetic layer (an NiO layer) cannot be present just under the magnetic layer, magnetic relaxation of the magnetic layer due to heat cannot be controlled by an exchange interaction between the magnetic layer of a cobalt alloy and the antiferromagnetic layer (NiO). Specifically, that the above two layers are in contact with each other or in a state corresponding to this is necessary for the development of the exchange interaction. Further, the chromium layer used as the underlayer in the present invention and the above publication is one commonly used in the art in order to regulate the orientation of the overlying magnetic layer to improve the magnetic properties (coercive force and squareness ratio). The disposition of the antiferromagnetic layer just under the magnetic layer in order to control the magnetic relaxation caused by heat, like the present invention, hinders the control of the orientation by the chromium layer. In the present invention, however, as previously described with reference to the model diagram, use of NiO, among antiferromagnetic materials, the crystal lattice spacing of which is approximately equal to that of chromium, enables the control of the orientation by the chromium layer to be maintained as it is.

Figure 2:
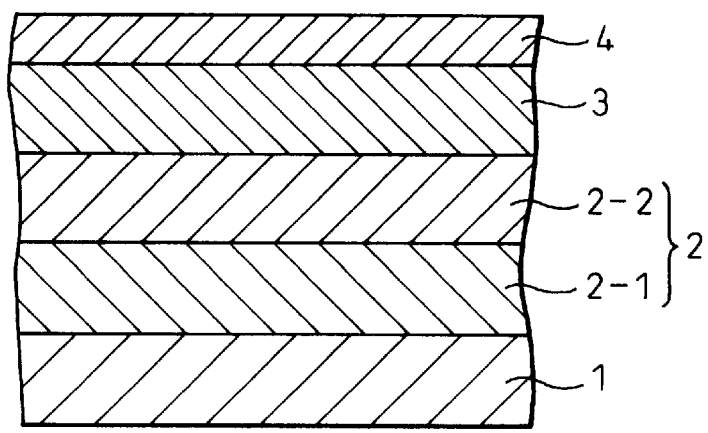
FIG. 2 is a cross-sectional view showing one preferred embodiment of the magnetic recording medium according to the present invention.

As described above, the magnetic recording medium according to the present invention comprises: a nonmagnetic substrate; and, provided on the nonmagnetic substrate in the following order, a first underlayer of a nonmagnetic material composed mainly of chromium, a second underlayer of an antiferromagnetic material, with a body-centered cubic structure, having a Néel temperature of at least 60° C., the second underlayer being such that, when the crystal lattice of the antiferromagnetic material is compared with the crystal lattice in the body-centered cubic structure of the first underlayer, the length of a side of the lattice in the (100) face of the former being approximately equal to the length of a diagonal of the lattice in the (100) face of the latter, permitting the second underlayer to be epitaxially grown onto the first underlayer, and a recording layer of a magnetic material composed mainly of cobalt. A typical layer construction is shown in FIG. 2 as a cross-sectional view. Specifically, as shown in the drawing, the magnetic recording medium according to the present invention may comprise: a nonmagnetic substrate 1; and, provided on the nonmagnetic substrate 1 in the following order, an underlayer 2 and a magnetic recording layer 3 of a magnetic material composed mainly of cobalt. The underlayer 2 has a two-layer structure of a first underlayer 2-1 of a nonmagnetic material composed mainly of chromium and a second underlayer 2—2 of an antiferromagnetic material having a Néel temperature of at least 60° C. In the drawing, a protective layer 4, which may be optionally provided in the present invention, is provided on the magnetic recording layer 3.

In the magnetic recording medium according to the present invention, the nonmagnetic substrate used as the substrate may be made of various substrate materials commonly used in the art. Suitable substrate materials include, but are not limited to, for example, NiP-plated aluminum (including aluminum alloys) disks, glass or reinforced glass disks, silicon disks having a surface oxide film (for example, a silicon oxide film), SiC disks, carbon disks, plastic disks, and ceramic disks. These substrates may have been textured as commonly applied in the art or may have not been textured. The size and thickness of the substrate may widely vary depending upon factors such as kinds of desired media and magnetic disk devices used. In general, the size and the thickness are respectively about 150 to 16,000 mm$^2$ and about 5 to 10 mm. They, however, are not limited to these values.

As described above, the underlayer provided on the nonmagnetic substrate has a two-layer structure. The first underlayer comprises a nonmagnetic material composed mainly of chromium. In particular, the first underlayer preferably contains chromium as a main constituent and molybdenum as a minor component. In the first underlayer, addition of molybdenum to chromium can offer advantages including that the lattice spacing of the underlayer can be widened. The amount of molybdenum added may widely vary. In general, however, it is about 0 to 30% by weight based on the total amount of the underlayer of the Cr/Mo alloy. Preferably, this underlayer may be formed, for example, by sputtering, such as magnetron sputtering, under conventional layer forming conditions. Suitable layer forming conditions are, for example, layer forming temperature of about 100–300° C., argon gas pressure of about 1–10 mTorr, and bias voltage of about −70 to −400 V. If necessary, instead of sputtering, other layer forming methods, for example, vapor deposition and ion beam sputtering, may be used. The thickness of the first underlayer may widely vary depending upon various factors such as the composition and properties thereof and the details of the second underlayer used in combination with the first underlayer. It, however, is preferably in the range of 10 to 50 nm.

The second underlayer, in view of the relation with the first underlayer provided just under the second underlayer and the magnetic recording layer provided just above the second underlayer and other requirements, comprises an antiferromagnetic material, with a body-centered cubic structure, having a Néel temperature of at least 60° C. and, when the crystal lattice of the antiferromagnetic material is compared with the crystal lattice in the body-centered cubic structure of the first underlayer, the length of a side of the lattice in the (100) face of the former is approximately equal to the length of a diagonal of the lattice in the (100) face of the latter, permitting the second underlayer to be epitaxially grown onto the first underlayer. Preferably, the antiferromagnetic material has a Néel temperature of at least 60° C. If the Néel temperature is below 60° C., the thermal stability of the magnetic recording medium in the environment (temperature) under which the medium is used could not be ensured. Antiferromagnetic materials suitable for the second underlayer are not particularly limited. However, NiO is especially preferred. Preferably, this underlayer may be formed, for example, by sputtering, such as magnetron sputtering, under conventional layer forming conditions. Suitable layer forming conditions are, for example, layer forming temperature of about 100–300° C., argon gas pressure of about 1–10 mTorr, and bias voltage of about −70 to −400 V. If necessary, instead of sputtering, other layer forming methods, for example, vapor deposition and ion beam sputtering, may be used. The thickness of the second underlayer may widely vary depending upon various factors such as the composition and properties thereof and the details of the first underlayer used in combination with the second underlayer. It is, however, preferably 10 to 100 nm.

As described above, the magnetic recording layer provided on the nonmagnetic substrate through the first and second underlayers comprises a magnetic material composed mainly of cobalt. Suitable cobalt-base magnetic materials for the magnetic recording layer include, but are not limited to, for example, Co-base two-component alloys, such as a CoPt alloy, a CoNi alloy, and a CoCr alloy, Co-base three-component alloys, such as CoCrPt, and four- or five-component alloys comprising a three-component alloy of CoCrPt with tantalum and/or niobium added thereto. One example of the composition of the Co-base alloy as the magnetic material in the practice of the present invention is as follows:

cobalt: 56 to 78 at %;

chromium: 14 to 22 at %;

platinum: 4 to 20 at %; and tantalum and/or niobium: 0.5 to 4 at %.

Preferably, the magnetic recording layer may be advantageously formed by sputtering under particular layer forming conditions. As with the formation of the underlayers, the magnetic recording layer may be formed by sputtering and, for example, by magnetron sputtering. Suitable layer forming conditions are, for example, layer forming temperature of about 100–350° C., argon gas pressure of about 1–10 mTorr, and bias voltage of about −70 to −400 V. If necessary, instead of sputtering, other layer forming methods, for example, vapor deposition and ion beam sputtering, may be used.

In the magnetic recording medium according to the present invention, the thickness of the magnetic recording layer may vary widely depending upon factors such as the composition of the Co-base alloy used for the formation of the magnetic recording layer and desired properties. In general, however, the thickness is preferably not more than 80 G. µm in terms of tBr (a product of the thickness t and the residual magnetization density Br of the recording layer). When the tBr of the magnetic recording layer is higher than 80 G. μm, the magnetic layer is substantially thermally stable and, hence, the thermal stabilization effect attained by the antiferromagnetic layer is small. On the other hand, excessively large layer thickness t cannot cope with high density recording.

The magnetic recording layer may generally have a single layer structure. If necessary, it may have a multi-layer structure of two or more mutually separated recording layers. That is, the magnetic recording layer may optionally be a multi-layer structure. In this case, the magnetic layers may be separated from each other through a nonmagnetic intermediate layer interposed between the respective two magnetic layers. Suitable nonmagnetic intermediate layers include, for example, a CrMo layer.

In the magnetic recording medium of the present invention, preferably, tantalum and/or niobium are added to a three-component alloy of CoCrPt from the viewpoint of simultaneously enhancing particularly the S/N ratio and the recording density, and, further, the layer construction and the layer forming process are optimized from the viewpoint of reducing the noise According to the finding by the present inventors, in the practice of the present invention, optimum film forming conditions may be selected for each selected substrate. For example, when the nonmagnetic substrate is an NiP-plated aluminum disk, the magnetic recording layer may be advantageously formed by sputtering at a layer forming temperature of 220 to 320° C. from cobalt, chromium, platinum, tantalum, and/or niobium.

If necessary, the magnetic recording medium of the present invention may further comprise, as the outermost layer and usually on the magnetic recording layer, a protective layer frequently adopted in the art. Suitable protective layers include, for example, a layer consisting of carbon alone and layers of carbon compounds, for example, C layer, WC layer, SiC layer, $B_4C$ layer, and hydrogen-containing C layer. In particular, a protective film of carbon can be advantageously used in the practice of the present invention. The above protective layer may be formed by the conventional method, for example, by sputtering or vapor deposition. The thickness of the protective layer may widely vary depending upon various factors. It, however, is preferably about 5 to 10 nm.

In the magnetic recording medium of the present invention, in addition to the above indispensable layers and optional layers, additional layers commonly used in the art may be provided. Otherwise, the layers constituting the magnetic recording medium may be optionally subjected to chemical treatment or the like. For example, the protective layer may have thereon a lubricant layer comprising a fluorocarbon resin or otherwise may be subjected to treatment for imparting the same effect attained by the lubricant layer.

According to a further aspect of the present invention, there is provided a magnetic disk device using the magnetic recording medium of the present invention described above and described below in detail. The structure of the magnetic disk device of the present invention is not particularly limited. In consideration of the fact that the magnetic recording medium according to the present invention is based on the in-plane magnetization recording system, however, basically, the device preferably comprises: a recording head section for recording information in a magnetic recording medium; and a reproducing head section for reproducing information. In particular, as will be described below, the reproducing head section is preferably provided with a magnetoresistive head using a magnetoresistor wherein the electric resistance changes in response to the magnetic field intensity, that is, an MR (magnetoresistive) head.

Preferably, the magnetic disk device of the present invention has a magnetoresistor and a conductor layer for supplying a sense current into the magnetoresistor, and a composite magnetic head comprising a lamination of a magnetoresistive reproducing head section, for reading information from the magnetic recording medium, and an induction type recording head section, for recording information on the magnetic recording medium, having a pair of thin film electrodes may be used. Magnetoresistive reproducing heads usable herein may have various structures known in the art and preferably include AMR (anisotropic magnetoresistive) heads utilizing anisotropic magnetoresistance and GMR (giant magnetoresistive) heads utilizing giant magnetoresistance (including spin valve GMR head and the like). The conductor layer of the reproducing head section may have various constructions. However, preferred conductor layers include:

1. a conductor layer having such a thickness that the thickness of the conductor layer in its portion in the vicinity of the magnetoresistor is relatively small with the thickness in the other portion being thick; and
2. a conductor layer wherein the thickness and the width of the conductor layer in its portion in the vicinity of the magnetoresistor are relatively small with the thickness and the width in the other portions being large. The thickness and optionally the width of the conductor layer to satisfy the above construction requirements may be regulated by various methods. A particularly recommendable method for such regulation is to increase the thickness by forming the conductor layer so as to have a multi-layer structure.

As compared with a conventional composite magnetic head (a magnetic head comprising a combination of a magnetoresistive reproducing head section for reading information with an induction type recording head section for recording information), a magnetic disk device particularly having the above construction can reduce the curving of the magnetic pole of the recording head section and, at the same time, can reduce the resistance of the conductor layer and, when the off-track is small, can read information with high accuracy and sensitivity.

Figure 3:
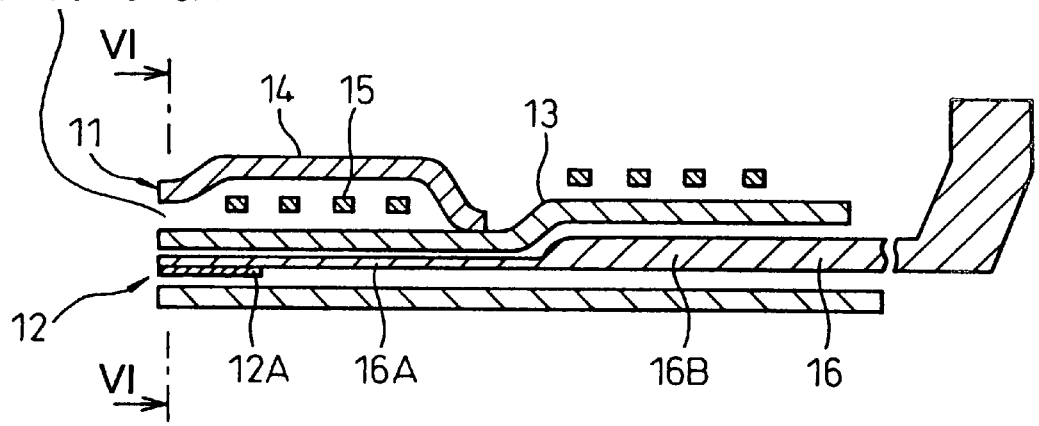
FIG. 3 is a cross-sectional view showing the principle of a head of the magnetic disk device of the present invention.
Figure 4:
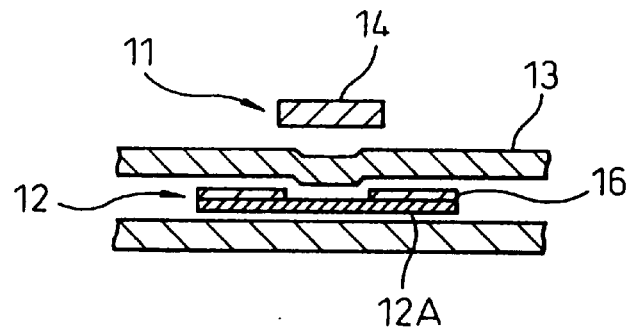
FIG. 4 is a cross-sectional view taken along line B—B of the head of the magnetic disk device shown in FIG. 3.

In the magnetic disk device of the present invention, preferably, the recording head section and the reproducing head section each may have a laminate structure as shown in FIGS. 3 and 4. FIG. 3 shows a diagram showing the principle of a head of the magnetic disk device according to the present invention, and FIG. 4 is a cross-sectional view taken along line B—B of FIG. 3.

In FIGS. 3 and 4, reference numeral 11 designates an induction type recording head section for recording information on a magnetic recording medium, and numeral 12 a magnetoresistive reproducing head section for reading information. The recording head section 11 comprises: a lower magnetic pole (an upper shield layer) 13 of NiFe or the like; an upper magnetic pole 14, of NiFe or the like, which faces the lower magnetic pole 13 while leaving a certain space; and a coil 15 for exciting the magnetic poles 13, 14 and permitting information recording on the magnetic recording medium to be conducted in a recording gap section.

The reproducing head section 12 is preferably constituted by an AMR head, a GMR head or the like. On a magnetoresistor section 12A are provided a pair of conductor layers 16, for supplying a sense current into the magnetoresistor section 12A, while leaving a space, corresponding to the width of a recording track, between the two conductor layers. In this case, the thickness of the conductor layers 16 is such that thickness of a portion 16A in the vicinity of the magnetoresistor section 12A is small with the thickness of the other portion 16B being large.

In the constructions shown in FIGS. 3 and 4, since the thickness of the conductor layer 16 is small in the portion 16A in the vicinity of the magnetoresistor section 12A, the curving of the lower magnetic pole (upper shield layer) 13 and the like is small. By virtue of this, the recording gap facing the magnetic recording medium is also not significantly deformed. Therefore, even though the position, on a track, of the magnetic head at the time of information recording is somewhat different from the position, on the track, of the magnetic head at the time of reading of the information, the magnetic disk device can accurately read information, making it possible to avoid a problem that reading errors occur despite a small off-track error.

On the other hand, since the thickness of the conductor layer 16 is large in the portion 16B other than that in the vicinity of the magnetoresistor section 12A, the resistance of the whole conductor layer 16 can be reduced. As a result, a change in resistance of the magnetoresistor section 12A can be detected with a high sensitivity, resulting in improved S/N ratio. Further, generation of heat in the conductor layer 16 can also be avoided, preventing the creation of noise attributable to the generation of heat.

EXAMPLES

Figure 5:
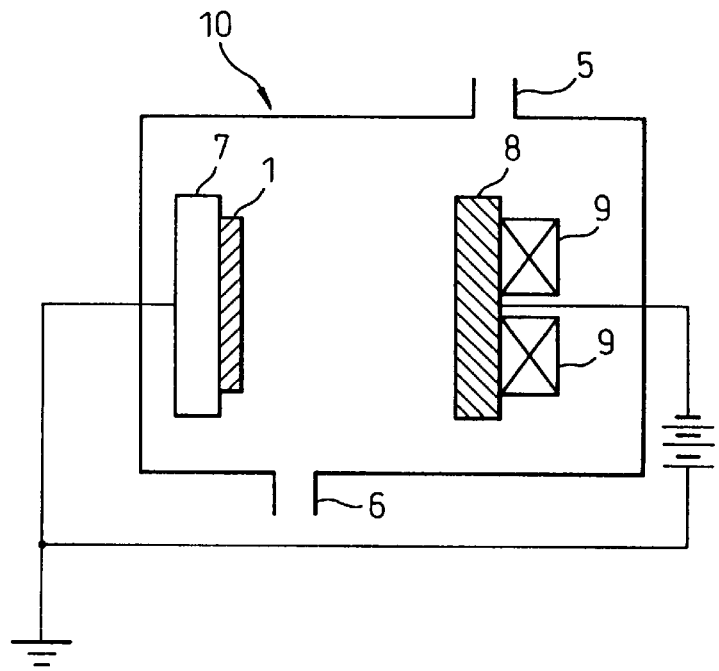
FIG. 5 is a schematic diagram showing a DC magnetron sputtering system used in the formation of the magnetic recording medium according to the present invention.

The present invention will be described in more detail with reference to the following typical examples. However, it should be understood that the present invention is not limited to these examples only. In the following examples, a DC magnetron sputtering system as shown in FIG. 5 was used to form an underlayer, a magnetic recording layer, and a protective layer. As shown in the drawing, a sputtering system 10 has an argon inlet 5 for introducing an argon gas into a sputtering chamber, an outlet 6, a susceptor 7 for supporting a disk substrate 1, a target 8, and a magnet 9. A vacuum of about 1 to 10 Torr can be applied to the sputtering chamber of the system.

Example 1
Production of magnetic recording medium

A first underlayer of $CrMo_{10}$ (at %), a second underlayer of NiO, and a magnetic recording layer of $Co_{74}Cr_{17}Pt_5Ta_4$ (at %) were deposited in that order on a thoroughly cleaned silicon disk substrate, using a DC magnetron sputtering system. In this case, a sputtering chamber was evacuated to not more than $3\times10^{-7}$ Torr prior to the formation of the first underlayer, the substrate was heated at 280° C., an argon gas was introduced to maintain the inside of the sputtering chamber at 5 mTorr. The first underlayer was formed using CrMo as a target under the application of a bias voltage of −200 V to obtain a layer thickness of 25 am. Subsequently, the argon pressure was regulated to bring the sputtering chamber to 25 mTorr, and a 50 nm-thick second underlayer was formed using an NiO target on the CrMo substrate layer. The bias voltage applied at the time of formation of the second underlayer was the same as that used in the formation of the first underlayer, that is, −200 V. The pressure within the sputtering chamber was again returned to 5 mTorr, and a target having the above composition for the magnetic recording layer was used to form a corresponding CoCrPtTa layer so as to give tBr=80 G. $\mu$m (corresponding to a thickness of 30 nm). The coercive force of the magnetic recording medium thus prepared was measured and found to be significantly excellent, that is, 1800 Oe.

The following Table 1 shows a comparison of the properties of a magnetic recording medium having CrMo10 (25 nm)/NiO (50 nm) underlayer according to the present example with the properties of a magnetic recording medium having an underlayer of CrMo10 (25 nm) alone. In this case, the smaller the magnetic viscosity constant S, the smaller the relaxation caused by heat. When the NiO underlayer is not provided, S is 0.20, whereas when NiO underlayer is provided, S is 0.09, indicating that provision of the NiO underlayer suppresses the thermal relaxation. Further, comparison of the time T10, defined as the time for the residual magnetization of the magnetic layer to be reduced due to heat by 10% from the initial state, between the two magnetic recording media shows that the medium using the NiO underlayer has better stability.

TABLE 1

| Construction of underlayer | Magnetic layer, tBr | Magnetic viscosity constant, S | T10 (year) |
|---|---|---|---|
| CrMo10 underlayer alone | 80 G · $\mu$m | 0.20 | $9 \times 10^{51}$ |
| CrMo10/NiO underlayers | 80 G · $\mu$m | 0.09 | $4 \times 10^{58}$ |

Example 2
Magnetic Disk Device

Figure 6:
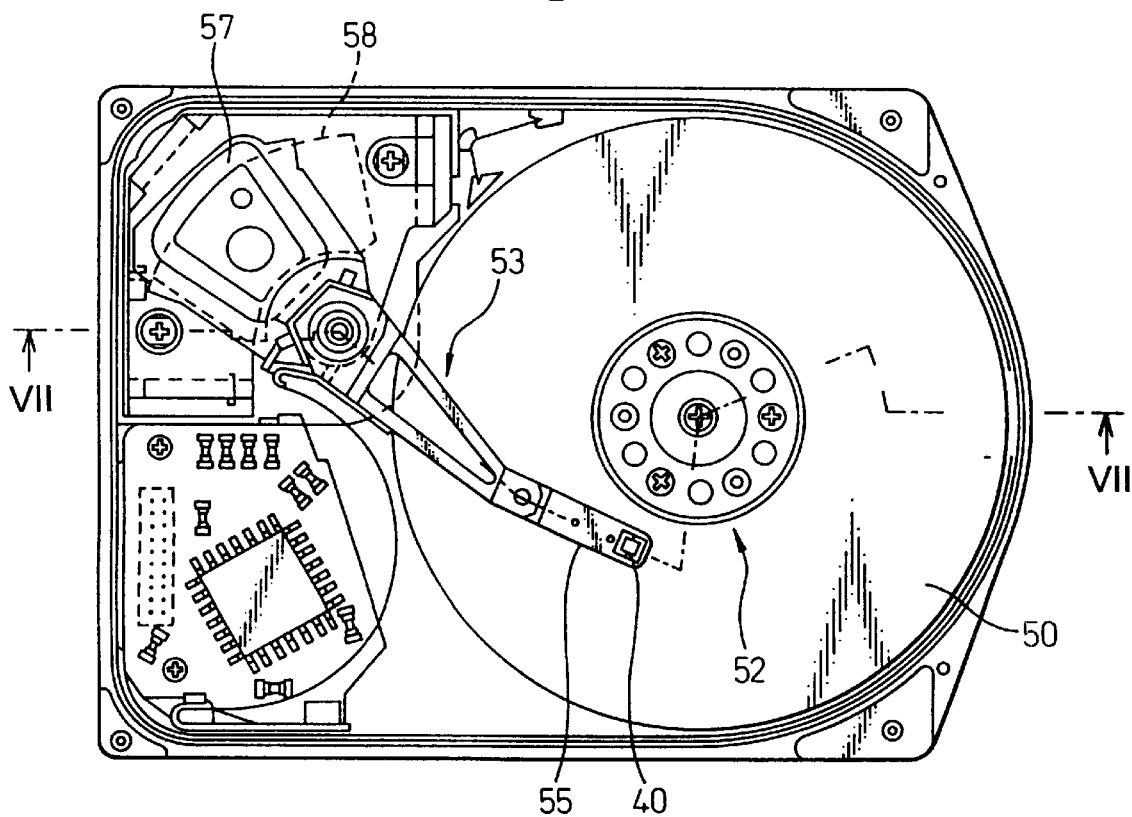
FIG. 6 is a plan view of the magnetic recording device, according to the present invention, using a slider provided with a magnetic head.
Figure 7:
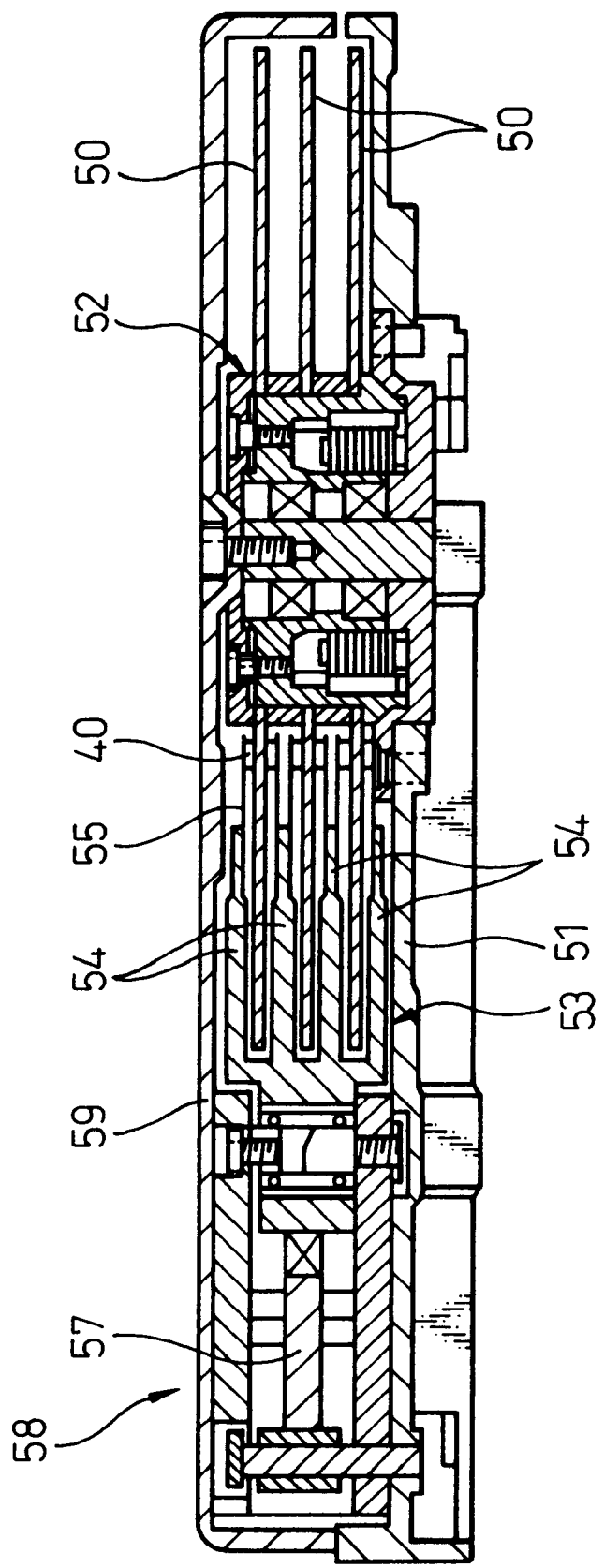
FIG. 7 is a cross-sectional view taken along line A—A of the magnetic disk device shown in FIG. 6.

FIG. 6 is a plan view of one preferred embodiment of the magnetic disk device (with a cover removed), according to the present invention, using a slider provided with a magnetic head, and FIG. 7 is a cross-sectional view taken along line A—A of FIG. 6.

In these drawings, numeral 50 designates a plurality of magnetic disks (three disks for the present embodiment) as a magnetic recording medium which is rotated and driven by means of a spindle motor 52 provided on a base plate 51.

Reference numeral 53 designates an actuator rotatably provided on the base plate 51. A plurality of head arms 54, which is extended toward the recording face of the magnetic disk 50 are provided on one rotation end of the actuator 53. A spring arm 55 is rotatably mounted on the rotation end of the head arm 54, and, further, the above slider 40 provided with a magnetic head is inclinably mounted through an insulating layer (not shown) on the flexure section of the spring arm 55. On the other hand, a coil 57 is provided on the other rotation end of the actuator 53.

A magnetic circuit 58 constituted by a magnet and a yoke is provided on the base plate 51, and the coil 57 is disposed within the magnetic gap of the magnetic circuit 58. The magnetic circuit 58 and the coil 57 constitute a moving coil type linear motor (VCM: voice coil motor). The upper surface of the base plate 51 is covered with a cover 59.

The operation of the magnetic disk device having the above construction will be described. Wraen the magnetic disk 50 is in a stopped state, the slider 40 is in contact with a siding zone and in a stopped state of the magnetic disk 50.

When the magnetic disk 50 is rotated and driven at a high speed by means of a spindle motor 52, an air stream created by the rotation of the magnetic disk 50 permits the slider 40 to fly above the disk face while leaving a very small space between the slider and the disk surface. In this state, the flow of a current through the coil 57 creates thrust in the coil 57, rotating the actuator 53. This permits the head (slider 40) to be moved on a desired track of the magnetic disk 50 to conduct reading/writing of data.

As described above, according to the present invention, as compared with the conventional magnetic recording medium, a magnetic recording medium can be provided which, even when the thickness of the magnetic recording layer is formed in a smaller thickness, has high coercive force and is thermally stable. Further, the present invention can realize a magnetic disk device which enables higher density recording than the conventional magnetic disk device.

We claim:

1. A magnetic recording medium having a recording layer of a magnetic material composed mainly of cobalt and formed on a multi-layered underlayer formed on a substrate, the multi-layered underlayer comprising:
   a first underlayer of a nonmagnetic material composed mainly of chromium;
   an epitaxially grown second underlayer of an antiferromagnetic material, with a body-centered cubic structure, having a Néel temperature of at least 60° C., the second underlayer being such that a length of a side of the lattice in the (100) face of the crystal lattice of the antiferromagnetic material is approximately equal to a length of a diagonal of the lattice in the (100) face of the crystal lattice in the body-centered cubic structure of the first underlayer, the recording layer being formed in direct contact with said second underlayer.

2. The magnetic recording medium according to claim 1, in which the second underlayer is formed of NiO.

3. The magnetic recording medium according to claims 1 or 2, in which the thickness of the first underlayer is 10 to 50 nm with the thickness of the second underlayer being 10 to 100 nm.

4. The magnetic recording medium according to claims 1 or 2, in which the recording layer has a thickness of not more than 80 G. $\mu$m in terms of tBr (a product of the thickness t and the residual magnetization density Br of the recording layer).

5. The magnetic recording medium according to claims 1 or 2, which further comprises a protective layer of carbon.

6. The magnetic recording medium according to claims 1 or 2, which is based on an in-plane magnetization recording system.

7. A process for producing a magnetic recording medium, which comprises sputtering a first underlayer of a nonmagnetic material composed mainly of chromium, a second underlayer of an antiferromagnetic material formed on said first underlayer and having a Néel temperature of at least 60° C., and a recording layer of a magnetic material composed mainly of cobalt formed directly on said second underlayer, in the recited order, on a nonmagnetic substrate.

8. The process for producing a magnetic recording medium according to claim 7, in which the nonmagnetic substrate is an NiP-plated aluminum disk and the recording layer is sputtered at a layer formation temperature of 220 to 320° C.

9. A magnetic disk device comprising:
   a recording head section for recording information in a magnetic recording medium;
   a reproducing head section for reproducing information with a magnetoresistive head,
   the magnetic recording medium having a recording layer of a magnetic material composed mainly of cobalt and formed on a multi-layered underlayer formed on a substrate, the multi-layered underlayer including:
      a first underlayer of a nonmagnetic material composed mainly of chromium;
      an epitaxially grown second underlayer of an antiferromagnetic material, with a body-centered cubic structure, having a Néel temperature of at least 60° C., the second underlayer being such that a length of a side of the lattice in the (100) face of the crystal lattice of the antiferromagnetic material is approximately equal to a length of a diagonal of the lattice in the (100) face of the crystal lattice in the body-centered cubic structure of the first underlayer, the recording layer being formed in direct contact with said second underlayer.

10. The magnetic disk device according to claim 9, wherein the magnetoresistive head is an AMR head or a GMR head.

* * * * *

UNITED STATES PATENT AND TRADEMARK OFFICE
CERTIFICATE OF CORRECTION

PATENT NO.    : 6,020,060
DATED         : February 1, 2000
INVENTOR(S)   : Yoshida et al.

It is certified that error appears in the above-identified patent and that said Letters Patent is hereby corrected as shown below:

<u>Title page,</u>
Item [57], ABSTRACT, please delete ABSTRACT as stated and replace it as follows -- A magnetic recording medium characterized by having a nonmagnetic substrate, provided with a first underlayer of a nonmagnetic material composed mainly of chromium and a second underlayer of an antiferromagnetic material with a body-centered cubic structure and having a Néel temperature of at least 60 C. The second underlayer has a crystal lattice of the antiferromagnetic material that is compared with the crystal lattice in the body-centered cubic structure of the first underlayer. The length of a side of the lattice in the (100) face of the former is apporoximately equal to the length of a diagonal of the lattice in the (100) face of the latter. This permits the second underlayer to be epitaxially grown onto the first underlayer. A recording layer of a magnetic material composed mainly of cobalt is also provided. -- therefor.

<u>Column 12,</u>
Lines 6 and 30, delete "C.," and insert -- C, -- therefor

Signed and Sealed this

Eighth Day of April, 2003

JAMES E. ROGAN
*Director of the United States Patent and Trademark Office*